United States Patent
Balakrishnan et al.

(10) Patent No.: US 6,879,498 B2
(45) Date of Patent: *Apr. 12, 2005

(54) SWITCHED MODE POWER SUPPLY RESPONSIVE TO CURRENT DERIVED FROM VOLTAGE ACROSS ENERGY TRANSFER ELEMENT INPUT

(75) Inventors: Balu Balakrishnan, Saratoga, CA (US); David Michael Hugh Matthews, Sunnyvale, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/834,645

(22) Filed: Apr. 29, 2004

(65) Prior Publication Data

US 2004/0208023 A1 Oct. 21, 2004

Related U.S. Application Data

(63) Continuation of application No. 10/437,521, filed on May 14, 2003, now Pat. No. 6,754,089, which is a continuation of application No. 10/241,093, filed on Sep. 11, 2002, now Pat. No. 6,597,586, which is a continuation of application No. 09/849,191, filed on May 4, 2001, now Pat. No. 6,480,399, which is a continuation-in-part of application No. 09/517,461, filed on Mar. 2, 2000, now Pat. No. 6,233,161.

(51) Int. Cl.$^7$ ............................................. H02M 3/335
(52) U.S. Cl. ........................................ 363/16; 363/41
(58) Field of Search ............................ 363/16, 34, 41, 363/49, 97, 131; 323/901, 282

(56) References Cited

U.S. PATENT DOCUMENTS

| 3,596,165 A | 7/1971 | Andrews |
| 4,293,812 A | 10/1981 | Kuback et al. |
| 4,443,839 A | 4/1984 | Onodera et al. |

(Continued)

FOREIGN PATENT DOCUMENTS

| EP | 0 585 788 A1 | 3/1994 |
| EP | 02 25 2583 | 3/2003 |

OTHER PUBLICATIONS

Leman, B. R., "Three–Terminal Power IC Cuts Off–Line Flyback Switcher Size and Cost", *Powerconversion & Intelligent Motion*, Intertec Communications, Venture, CA, US, (Aug. 1995), pp. 15–28.

Neale, R., "Tiny Switch Offers The Mains Plug Integrated Power Supply", *Electronic Engineerring*, Morgan–Grampian Ltd., London GB, vol. 70, No. 861, (Oct. 1998), pp. 51–52.

"Design Idea DI–1: TOPSwitch® Buck Converter Data Sheet", *Lower Integrations, Inc.*, (Jun. 1998).

"TinySwitch™ Family Data Sheet", *Power Integrations, Inc.*, (Feb. 1999), pp. 1–16.

"TOPSwitch®–II Family Data Sheet", *Power Integrations, Inc.*, (Dec. 1997), pp. 1–32.

*Primary Examiner*—Adolf Berhane
(74) *Attorney, Agent, or Firm*—Blakely, Sokoloff Taylor & Zafman LLP

(57) ABSTRACT

A switched mode power supply having a regulated reflected voltage. In one embodiment, a switched mode power supply includes a power supply regulator coupled between a positive input supply rail of the power supply and a primary winding of an energy transfer element. The reflected voltage across the primary winding of the transfer element is related to the output voltage across a secondary winding of the energy transfer element according to the turns ratio of the energy transfer element. The power supply regulator is coupled to regulate the reflected voltage across the primary winding, thereby regulating the output voltage across secondary winding. In one embodiment, the reflected voltage across the primary winding is sensed through a current representative of the reflected voltage received by the power supply regulator.

11 Claims, 8 Drawing Sheets

U.S. PATENT DOCUMENTS

| | | |
|---|---|---|
| 4,644,254 A | 2/1987 | Panse |
| 5,282,107 A | 1/1994 | Balakrishnan |
| 5,285,369 A | 2/1994 | Balakrishnan |
| 5,313,381 A | 5/1994 | Balakrishnan |
| 5,973,945 A | 10/1999 | Balakrishnan et al. |
| 5,995,381 A | 11/1999 | Wakamatsu |
| 6,067,236 A | 5/2000 | White |
| 6,075,353 A | 6/2000 | Johnson et al. |
| 6,208,531 B1 | 3/2001 | Vinciarelli et al. |
| 6,226,190 B1 | 5/2001 | Balakrishnan et al. |
| 6,233,161 B1 | 5/2001 | Balakrishnan et al. |
| 6,480,399 B2 | 11/2002 | Balakrishnan et al. |
| 6,597,586 B2 | 7/2003 | Balakrishnan et al. |

SWITCHED MODE POWER SUPPLY RESPONSIVE TO CURRENT DERIVED FROM VOLTAGE ACROSS ENERGY TRANSFER ELEMENT INPUT

CROSS REFERENCE TO RELATED APPLICATION

This application is a continuation of U.S. application Ser. No. 10/437,521, filed May 14, 2003, now U.S. Pat. No. 6,754,089, which is a continuation of U.S. application Ser. No. 10/241,093, filed Sep. 11, 2002, now U.S. Pat. No. 6,597,586 B2, which is a continuation of U.S. application Ser. No. 09/849,191, filed May 4, 2001, now U.S. Pat. No. 6,480,399 B2, which is a continuation-in-part application of U.S. application Ser. No. 09/517,461, filed Mar. 2, 2000, now U.S. Pat. No. 6,233,161 B1.

BACKGROUND OF THE INVENTION

1. Field of the Invention

The present invention relates generally to power supplies and, more specifically, the present invention relates to a switched mode power supply.

2. Background Information

Electronic devices use power to operate. Linear power supplies or adapters are widely used to power electronic products as well as charge batteries used to power mobile products such as for example wireless phones, palm top computers, toys, etc. due to their low cost. However, linear adapters typically include 50–60 Hz transformers, which result in linear power supplies that are very bulky and inefficient.

Switched mode power supplies are commonly used due to their high efficiency and good output regulation to supply power to many of today's electronic devices. Switched mode power supplies offer the benefits of smaller size, weight, high efficiency and low power consumption at no load in many applications relative to linear power supplies. However, known switched mode power supplies are generally more expensive than their linear power supply counterparts at low power levels, for example below 5 watts, due to the relatively high number and cost of components and the complexity of circuitry. Consequently, linear power supplies are still commonly used in applications having power levels below 5 watts, even though the linear power supplies are bulky and inefficient.

SUMMARY OF THE INVENTION

Switched mode power supplies are disclosed. In one embodiment, a power supply includes an energy transfer element having an energy transfer element input and an energy transfer element output, a power switch coupled between the energy transfer element input and a positive input supply rail, and control circuitry coupled to the energy transfer element input and to the power switch. The control circuitry is coupled to switch the power switch in response to a current derived from the voltage at the energy transfer element input. Additional features and benefits of the present invention will become apparent from the detailed description, figures and claims set forth below.

BRIEF DESCRIPTION OF THE DRAWINGS

The present invention detailed illustrated by way of example and not limitation in the accompanying figures.

DETAILED DESCRIPTION

A novel switched mode power supply regulator is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment, the present invention provides a simple low cost switched mode power supply. The present invention reduces the cost and component count of a switched mode power supply, which enables the presently described power supply to be cost effective when used in low power applications, including applications with power levels below 5 watts. Therefore, various embodiments of the power supply of the present invention may be used as cost effective alternatives to replace AC to DC linear adapters and battery chargers that use 50–60 Hz transformers, such as for example those power supplies used for wireless phone chargers or the like.

In one embodiment, the presently described power supply reduces the component count of known switched mode power supplies by regulating the reflected voltage from the energy transfer element. The energy transfer element may be a transformer, an inductor, coupled inductors, or the like. For instance, using a transformer having a primary winding and a secondary winding, one embodiment of the present invention includes a power supply regulator coupled between the positive input supply rail of the power supply and the primary winding. The power supply regulator of the present invention is therefore able to regulate the reflected voltage from the primary winding, which is related to the output voltage on the secondary winding through the turns ratio of the transformer. Thus, the switched mode power supply regulates the reflected voltage from the primary winding, which regulates the output voltage on the secondary winding. The presently described power supply in one embodiment provides regulated output without feedback circuitry coupled to the secondary winding to monitor the output voltage directly. This enables the present invention to have a lower component count than known switched mode power supplies.

Figure 1:
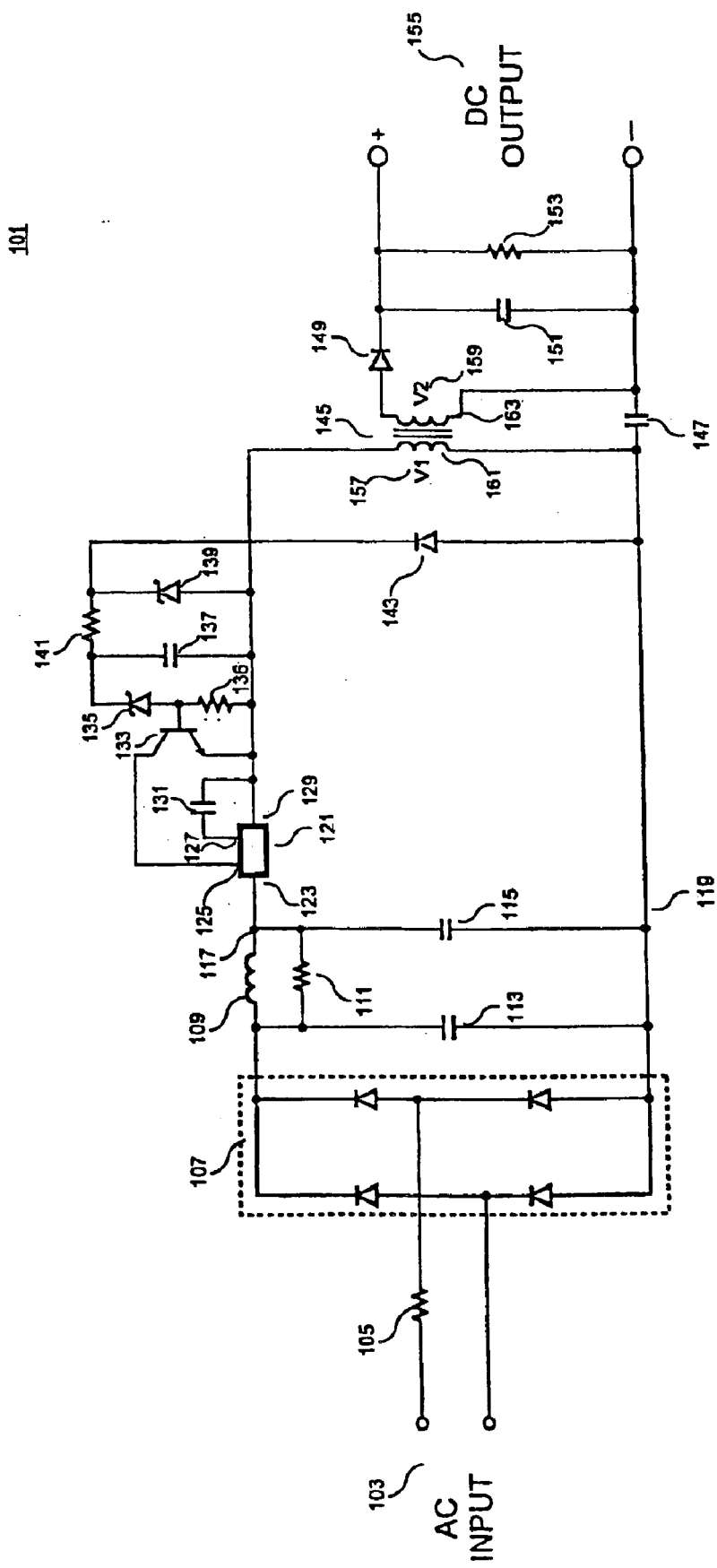
FIG. 1 is a schematic illustrating one embodiment of a power supply including a power supply regulator coupled to regulate a reflected voltage from a primary winding of an energy transfer element in accordance with the teachings of the present invention.

To illustrate, FIG. 1 is a schematic showing one embodiment of a power supply 101 in accordance with the teachings of the present invention. As shown, one embodiment of power supply 101 includes a flyback converter having alternating current (AC) input 103 and a direct current (DC) output 155. A rectifier 107 is coupled to AC input 103 through a resistor 105. In one embodiment resistor 105 is a fusible resistor that is used for fault protection in place of a fuse for lower cost. In another embodiment, a fuse or the like is used in place of resistor 105. Rectifier 107 converts the AC from AC input 103 to DC, which is then filtered in one embodiment by capacitors 113 and 115, which are coupled in parallel across rectifier 107. In one embodiment, an inductor 109 is coupled between capacitors 113 and 115 such that a π filter is formed to filter electromagnetic interference (EMI) generated by power supply 101. A resistor 111 is coupled in parallel with inductor 109 between capacitors 113 and 115 in one embodiment to damp inductor resonance from inductor 109 that can cause peaks in the EMI spectrum.

In one embodiment, a low frequency (e.g. 50 Hz or 60 Hz mains frequency), high voltage AC is received at AC input 103 and is converted to high voltage DC with rectifier 107 and capacitors 113 and 115. Thus, a positive input supply rail 117 and negative input supply rail 119 are provided at opposite ends of capacitor 115. The high voltage DC is then converted to high frequency (e.g. 20 to 300 kHz) AC, using a switched mode power supply regulator 121. This high frequency, high voltage AC is applied to an energy transfer element 145, such as for example a transformer, to transform the voltage, usually to a lower voltage, and to usually provide safety isolation. The output of the energy transfer element 145 is rectified to provide a regulated DC output at DC output 155, which may be used to power an electronic device. In the embodiment depicted, energy transfer element 145 is a transformer or coupled inductor having an input primary winding 161 magnetically coupled to an output secondary winding 163.

In one embodiment, the power supply regulator 121 utilized in a power supply in accordance with the teachings of the present invention comprises a single monolithic chip, which may be for example a known TINYSwitch power supply regulator of Power Integrations, Incorporated, of San Jose, Calif. In another embodiment, a power supply may utilize for example a known TOPSwitch power supply regulator of Power Integrations, Incorporated, of San Jose, Calif., in accordance with the teachings of the present invention. In one embodiment, power supply regulator 121 includes an electrical terminal 123 coupled to the positive input supply rail 117 and an electrical terminal 129 coupled to primary winding 161 of energy transfer element 145. Thus, power supply regulator 121 is coupled in series with primary winding 161.

In one embodiment, power supply regulator 121 includes a power switch coupled between electrical terminals 123 and 129 and associated control circuitry coupled to control or switch the power switch. In one embodiment, the associated control circuitry includes an oscillator, a latch, current limit circuitry, control logic, start-up and protection circuitry. In one embodiment, the power switch within power supply regulator 121 is turned on every cycle by the oscillator by setting the latch, and is turned off when either the current through the power switch reaches a current limit value or if a maximum on time is reached, by resetting the latch.

In one embodiment, the power supply regulator 121 also includes a bias supply electrical terminal 127. In one embodiment, a capacitor 131 is coupled between terminals 127 and 129 to provide energy storage and high frequency bypassing.

In operation, energy is transferred to secondary winding 163 from the primary winding 161 in a manner controlled by the power supply regulator 121 to provide the clean and steady source of power at the DC output 155. When the power switch within power supply regulator 121 is on, input supply rail 117 is coupled to primary winding 161 and current ramps up in primary winding 161. When the power switch within power supply regulator 121 is turned off, the current flow through primary winding 161 is interrupted, which forces the voltages V1 157 on primary winding 161 and V2 159 on secondary winding 163 to reverse. The reversal of voltages in V1 157 and V2 159 when the power switch is off allows diode 149 to conduct to deliver stored energy in the energy transfer element to DC output 155.

During the period that the power switch in power supply regulator 121 is off and diode 149 conducts, the voltage V1 157 on primary winding 161 is a reflected voltage of voltage V2 159 on the secondary winding 163. In one embodiment, the reflected voltage V1 157 is opposite in polarity to the voltage V1 157 applied to primary winding 161 when the power switch in power supply regulator 121 is on and related to V2 159 by the turns ratio of the transformer of energy transfer element 145. To illustrate, assume for example that the transformer of energy transfer element 145 has a 20:1 turns ratio. In this instance, if there is 5 volts (V2 159) across the secondary winding 163, the reflected voltage (V1 157) across the primary winding 161 would be 100 volts during the period that the power switch in power supply converter 121 is off and diode 149 conducts. At this time, the polarity of reflected voltage V1 157 is reversed and the voltage at electrical terminal 129 is low relative to the voltage at input supply rail 119.

In one embodiment, the reflected voltage V1 157 is used as feedback to provide information to power supply regulator 121 through diode 143, resistor 141, capacitor 137, zener diode 135, resistor 136 and transistor 133. When the power switch of power supply regulator 121 is turned off, the reversed polarity of the reflected voltage V1 157 across primary winding results in diode 143 conducting. When the power switch of power supply regulator 121 is turned on, diode 143 no longer conducts.

In one embodiment, when the voltage is reflected in voltage V1 157, there is also a voltage spike in the reflected voltage when the power switch in power supply regulator 121 is switched off due to leakage inductance in primary winding 161, which is a part of the inductance of the primary winding 161 that is not coupled to secondary winding 163. The energy contained in this voltage spike is commonly referred to as leakage energy. The leakage energy, which is not coupled to secondary winding 163, is clamped by zener diode 139. In another embodiment, a resistor capacitor-diode (RCD) clamped circuit can be used instead of zener diode 139. In that embodiment, a parallel combination of a resistor and capacitor is used in place of zener diode 139.

In one embodiment, a low pass RC filter is provided by resistor 141 and capacitor 137 to filter the voltage spike caused by the leakage energy, which would otherwise represent an error in the reflected output voltage feedback. After the voltage spike, the remaining voltage of reflected voltage V1 157 indicates the output voltage V2 159 divided by the turns ratio of the transformer of energy transfer element 145, ignoring forward voltage drops of diodes 143 and 149. In one embodiment, when the output of the RC filter of resistor 141 and capacitor 137, which is the voltage across capacitor 137, exceeds the zener voltage of zener diode 135 plus the base to emitter voltage $V_{BE}$ of transistor 133, transistor 133 is switched on. When transistor 133 is switched on, power supply regulator 121 is disabled from switching by electrical terminal 125 being pulled to a low voltage through transistor 133.

In this embodiment, the power supply regulator 121 is disabled from switching by the transistor 133 for a number of switching cycles, which is a function of the output load. For example, with low load levels at the DC output 155, the voltage across the capacitor 137 is slightly higher, which overdrives the transistor 133, keeping it on for a longer period of time. In this case, the power supply regulator 121 is disabled for many switching cycles and only few in many switching cycles is enabled. Whereas, with high load levels at the DC output 155, the voltage across the capacitor 137 is slightly lower, which provides less overdrive for the transistor 133, keeping transistor 133 on for a shorter period of time. Therefore, the power supply regulator 121 is disabled for fewer switching cycles and enabled for a large number of switching cycles. This way the power delivered to the DC output 155 is regulated to maintain the voltage across capacitor 137 in a relatively narrow range above the threshold set by the zener diode 135 and the base to emitter voltage $V_{BE}$ of transistor 133, independent of output load conditions. In another embodiment, a known PWM regulator such as for example a TOPSwitch power supply regulator (not shown) could be used instead of the power supply regulator 121. In this case, the voltage across the capacitor 137 can be used to reduce the duty cycle of the power switch within the TOPSwitch power supply regulator, when the voltage reaches a threshold value. The duty cycle can be reduced from a larger value at just below this threshold to a lower value at a voltage slightly above the threshold such that the voltage across the capacitor 137 is maintained within a narrow range above the threshold independent of the output load conditions.

Therefore, the output voltage V2 159 at DC output 155 of power supply 101 is regulated in accordance with the teachings of present invention by monitoring or regulating the reflected voltage V1 157 across primary winding 161. By regulating the reflected voltage V1 157, the output voltage V2 159 is regulated. It is appreciated that output voltage V2 159 is regulated by power supply 101 without the use of feedback circuitry coupled to DC output 155. Indeed, known flyback power converters often utilize circuitry such as opto-couplers or a separate feedback winding to provide feedback information. Thus, the component count of the presently described power supply 101 is reduced compared to known switched mode power supplies.

In one embodiment, the turns ratio of the transformer of energy transfer element 145 is designed to accommodate an output short circuit current condition in accordance with an internal current limit of the power switch of the power supply regulator 121. In one embodiment, a constant output current/constant output voltage characteristic is provided at DC output 155 by power supply 101 for applications such as for example battery charging. In one embodiment, power supply 101 includes a resistor 153 coupled across DC output 155 to provide a minimum load to improve load regulation at no load.

Figure 2:
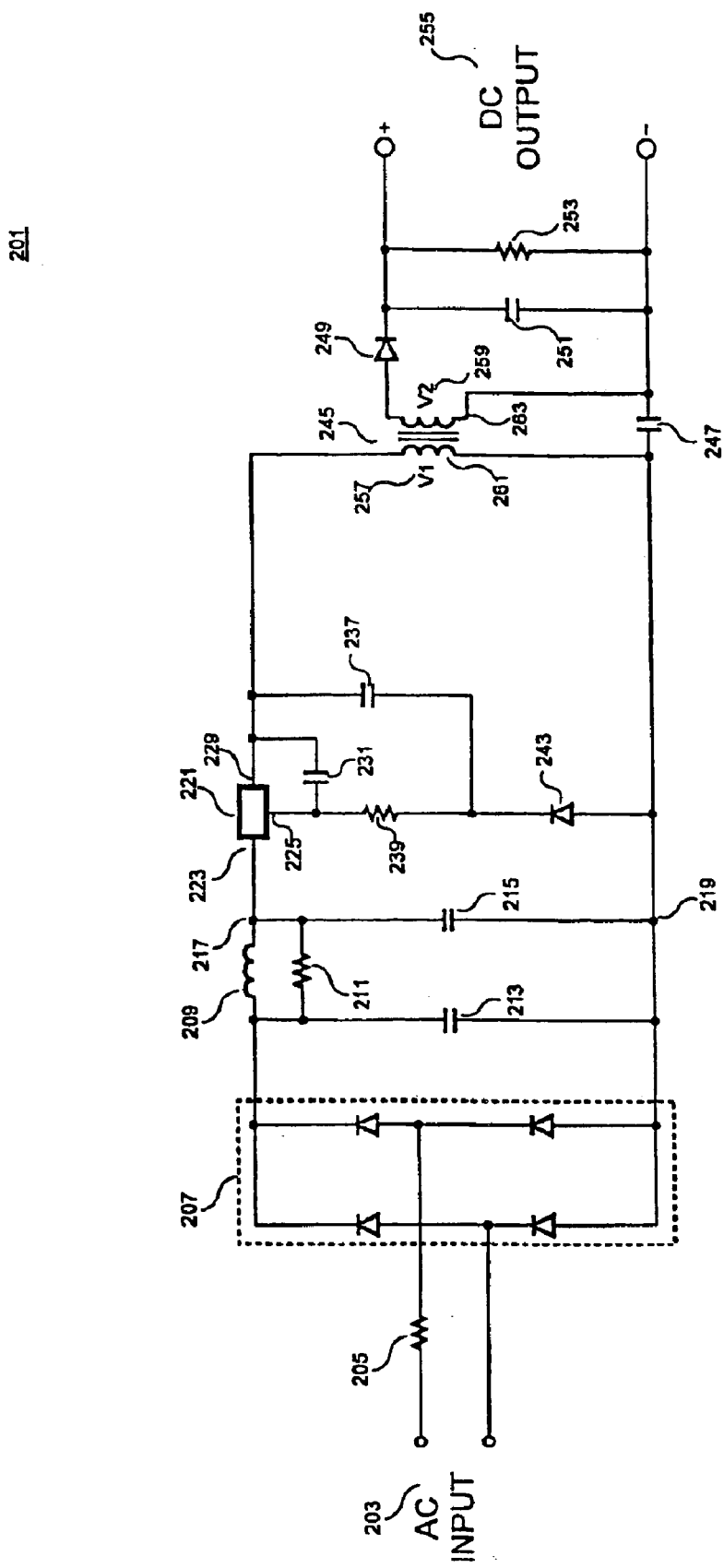
FIG. 2 is a schematic illustrating another embodiment of a power supply including a power supply regulator coupled to regulate a reflected voltage from a primary winding of an energy transfer element in accordance with the teachings of the present invention.

FIG. 2 is a schematic of another embodiment of a power supply 201 in accordance with the teachings of the present invention. As shown, one embodiment of power supply 201 is a flyback converter having AC input 203 and a DC output 255. Rectifier 207 is coupled to AC input 203 through a resistor 205. Rectifier 207 converts the AC from AC input 203 to DC, which is then filtered in one embodiment by capacitors 213 and 215, which are coupled in parallel across rectifier 207. In one embodiment inductor 209 and resistor 211 are coupled in parallel between capacitors 213 and 215.

In one embodiment, low frequency, high voltage AC is received at AC input 203 and is converted to high voltage DC with rectifier 207 and capacitors 213 and 215 providing positive input supply rail 217 and negative input supply rail 219 at opposite ends of capacitor 215. The high voltage DC is then converted to high frequency AC using a switched mode power supply regulator 221. This high frequency, high voltage AC is applied to an energy transfer element 245 to transform the voltage, usually to a lower voltage, and to usually provide safety isolation. The output of the energy transfer element 245 is rectified to provide a regulated DC output at DC output 255. In the embodiment depicted, energy transfer element 245 is a transformer or coupled inductors having an input primary winding 261 magnetically coupled to an output secondary winding 263.

In one embodiment, power supply regulator 221 includes a power switch coupled between electrical terminals 223 and 229 and associated control circuitry coupled to control the power switch. In operation, energy is transferred to secondary winding 263 from the primary winding 261 in a manner controlled by the power supply regulator 221. When the power switch within power supply regulator 221 is on, input supply rail 217 is coupled to primary winding 261 and current ramps up in primary winding 261. When the power switch within power supply regulator 221 is turned off, the current flow through primary winding 261 is interrupted, which forces the voltages V1 257 on primary winding 261 and V2 259 on secondary winding 263 to reverse. The reversal of voltages in V1 257 and V2 259 when the power switch is off allows diode 249 to conduct to deliver stored energy in the energy transfer element to DC output 255. In addition, the reversal of voltages in V1 257 and V2 259 allows diode 243 to conduct, which enables capacitor 237 to sample and hold the reflected voltage V1 257 across primary winding 261.

Figure 3:
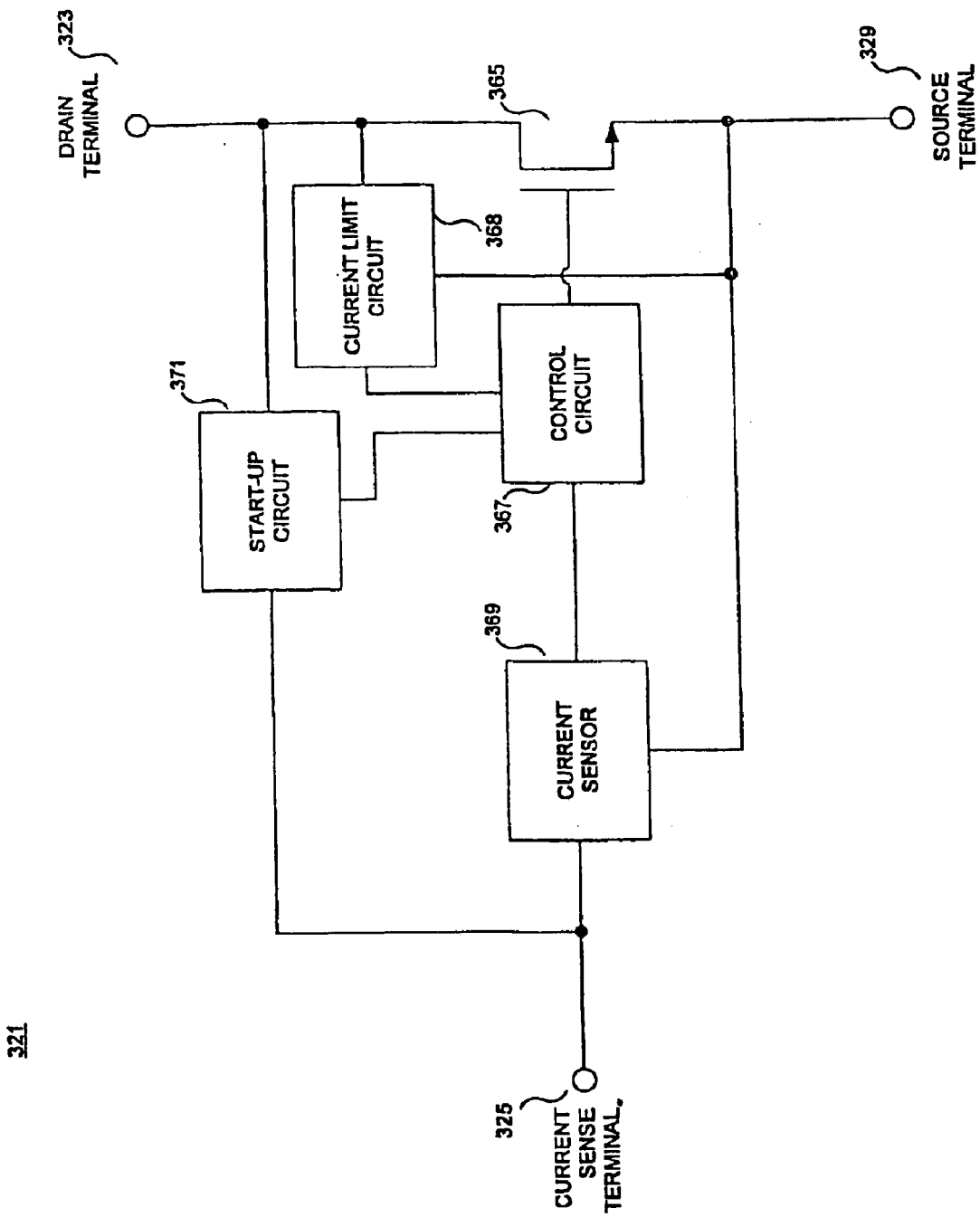
FIG. 3 is a diagram illustrating a power supply regulator including circuitry to regulate a reflected voltage from an energy transfer element of a power supply in accordance with the teachings of the present invention.

In one embodiment, electrical terminal 225 is a low impedance current sense terminal that senses current through resistor 239. In the embodiment depicted, the current that flows through resistor 239 is responsive to the voltage across capacitor 237, which is responsive to reflected voltage V1 257 across the primary winding 261 of energy transfer element 245. In the embodiment depicted, resistor 239, capacitor 237 and diode 243 form an RCD clamp, which clamps the inductive leakage voltage spikes that occur across primary winding 261 when the power switch in power supply regulator 221 is switched off. In one embodiment, a relatively slow diode is designed for diode 243 such that there is a relatively constant DC voltage across capacitor 237, which is substantially the same as the reflected voltage V1 257 across primary winding 261. In one embodiment, the reflected voltage V1 257 is related by the turns ratio of energy transfer element 245 to the output voltage V2 259 across secondary winding 263. FIG. 3 is a block diagram illustrating one embodiment of a power supply regulator 321 in accordance with the teachings of the present invention. In one embodiment, power supply regulator 321 is one embodiment of a regulator that may be used in place of power supply regulator 221 of FIG. 2. In one embodiment, power supply regulator 321 is included on a single monolithic chip having as few as three electrical terminals. As illustrated in FIG. 3, power supply regulator 321 includes a power switch 365 coupled between electrical terminals 323 and 329. In one embodiment, power switch 365 comprises a metal oxide semiconductor field effect transistor (MOSFET). In one embodiment, power switch 365 comprises an n-channel MOSFET having a drain coupled to terminal 323 and a source coupled to terminal 329. In one embodiment, terminal 323 is configured to be coupled to a positive input supply rail and terminal 329 is configured to be coupled to an energy transfer element of a power supply.

As shown in the embodiment depicted, power supply regulator 321 also includes a current sensor 369 coupled to receive a current through current sense terminal 325. In one embodiment, the current received through the current sense terminal 325 is responsive to a reflected voltage from a energy transfer element of a power supply that power supply regulator 321 is coupled to regulate. In one embodiment, power switch 365 is switched in response to the current received through the current sense terminal 325. In addition, current sensor 369 provides in one embodiment a low impedance connection between current sense terminal 325 and terminal 329. A control circuit 367 is coupled to current sensor 369 and power switch 365 in one embodiment. As such, control circuit 367 is coupled to control the switching of power switch 365 responsive to the current coupled to be received through current sense terminal 325.

In one embodiment, power supply regulator 321 also includes a start-up circuit 371 coupled to current sense terminal 325, terminal 323 and control circuit 367. One embodiment of control circuit 367 includes a voltage mode or a current mode pulse width modulator (PWM)regulator or the like to control the switching of power switch 365. In another embodiment, control circuit 367 includes an on/off control circuit, or a variable frequency circuit, or a cycle skipping circuit, or the like to control the switching of power switch 365.

In one embodiment, a current limit circuit 368 is also included in power supply regulator 321. As illustrated, current limit circuit 368 is coupled to the drain and source of power switch 365 and coupled to control circuit 367. In one embodiment, current limit circuit 368 monitors the current that flows through power switch 365 when turned on by monitoring the drain to source voltage of power switch 365. In one embodiment, the on resistance of power switch 365 is used as a current sense resistor. In one embodiment, when the current that flows through power switch 365 reaches a current limit, control circuit 367 adjusts the switching of power switch 365 accordingly such that that the current that flows through power switch 365 does not exceed the current limit.

In one embodiment, the current limit of the power switch 365 determined by current limit circuit 368 is adjusted in response to the current representative of the reflected voltage received through current sense terminal 325. For example, in one embodiment, the current limit is adjusted from a lower value during start up of the power supply to a higher value at a regulation threshold.

In one embodiment, a bias current used to power the circuitry of power supply regulator 321 after start-up is also coupled to be received through current sense terminal 325. In one embodiment, a capacitor is configured to be coupled between current sense terminal 325 and terminal 329. Referring briefly back to the embodiment illustrated in FIG. 2, this capacitor may correspond to capacitor 231 coupled between terminals 225 and 229. In one embodiment, capacitor 231 also provides control loop compensation for power supply 201. In another embodiment, the bias current used to power the circuitry of power supply regulator 321 may be derived from terminal 323. In this embodiment, a capacitor may be coupled between a separate bias supply electrical terminal (not shown) and terminal 329 for energy storage and high frequency bypassing.

Operation of an embodiment of power supply 201 utilizing a power supply regulator 321 for power supply regulator 221 is as follows. Assume for this illustration that terminals 223, 225 and 229 of power supply regulator 221 correspond to terminals 323, 325 and 329, respectively, of power supply regulator 321. Referring to both FIGS. 2 and 3, at power-up or a beginning of a start-up period of power supply 201, start-up circuit 371 in one embodiment is coupled to provide a current between terminal 323 and current sense terminal 325 to charge capacitor 231 to an adequate voltage to provide the bias current used to supply power to power supply regulator 321 for the duration of the start-up condition. In one embodiment, a current source (now shown) included within start-up circuit 371 is activated to draw current from terminal 323 to charge capacitor 231 through current sense terminal 325. After capacitor 231 is sufficiently charged, the current source in start-up circuit 371 is deactivated. When the sufficient voltage is reached in capacitor 231, the energy stored in capacitor 231 is used in one embodiment to operate power supply regulator 321 long enough to complete the start-up of power supply 201.

In another embodiment, an additional terminal (not shown) may be included for connection to a start-up energy storage capacitor, such as for example capacitor 231. Alternatively, in this embodiment, the bias current used to power the power supply regulator 321 may be derived from terminal 323 both during start-up and during normal operation after start-up. In either case, the capacitor coupled to the additional terminal can also perform the function of high frequency bypassing.

During start-up of power supply 201, the current received through current sense terminal 325 representative of the reflected voltage V1 257 from primary winding 261 is substantially zero. At this time, one embodiment of current limit circuit 368 and control circuit 367 are coupled to switch power switch 365 such that a limited amount of power is delivered to secondary winding 263 to charge output capacitor 251, resulting in reflected voltage V1 257 eventually being large enough to charge capacitor 237 to drive current through resistor 239 into current sense terminal 325.

In one embodiment, after start-up, the current driven through resistor 239 is also used to supply the bias current used to supply power to power supply regulator 321. In one embodiment, the current driven through resistor 239 to supply the bias current also includes current resulting in the inductive leakage voltage spikes that occur across primary winding 261 when power switch 365 is switched off. It is appreciated that known switched mode power supplies often simply dissipate the energy caused by leakage inductance. Thus, power supply 201 has increased efficiency over known switched mode power supplies because a part of the energy from the leakage inductance is utilized to supply power to power supply regulator 321. In addition, a separate bias winding on the energy transfer element 245 is not needed to provide the bias supply current, as is sometimes the case in known switched mode power supplies. Thus, power supply 201 operates with fewer components than known switched mode power supplies, which reduces cost.

In one embodiment, as the current representative of the reflected voltage V1 257 driven through resistor 239 into current sense terminal 325 increases, power supply regulator 321 is coupled to increase the power level delivered to DC output 255 such that a substantially constant output current is delivered by DC output 255, which is substantially independent of the output voltage across DC output 255. In one embodiment, the power level delivered to the DC output 255 is changed by changing the current limit determined by current limit circuit 368 of power switch 365 from a lower value at start-up as a function of the current through resistor 239 to a higher value at the regulation threshold.

In one embodiment, when the current representative of the reflected voltage V1 257 driven through resistor 239 reaches the regulation threshold, power supply regulator 321 is coupled to reduce the power delivered by power switch 365 such that reflected voltage V1 257 is maintained very close to this level, which drives current approximately equal to the regulation threshold through resistor 239. Accordingly, the output voltage V2 259 is maintained at a voltage related to reflected voltage V1 257 based on the turns ratio of energy transfer element 245, the regulation threshold value and the value of resistor 239.

Figure 4:
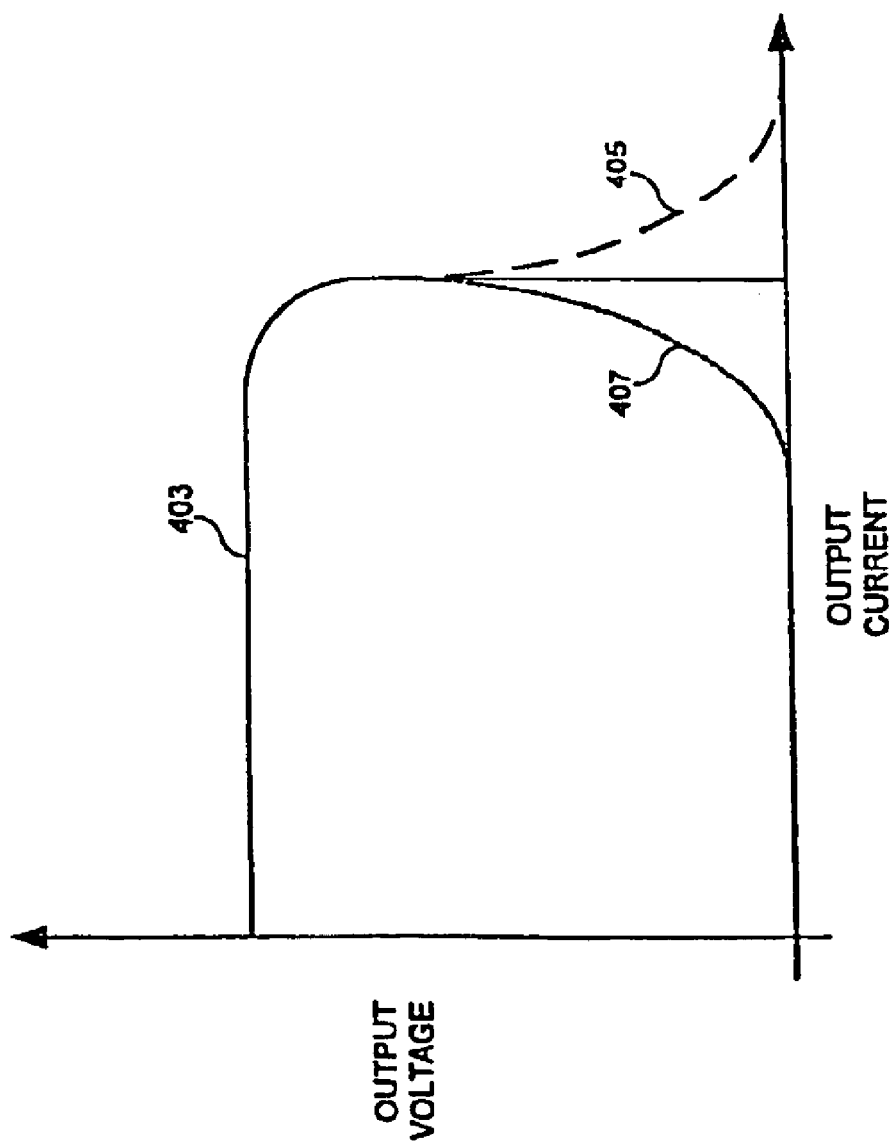
FIG. 4 is a diagram illustration the output current/voltage relationship for several embodiments of power supply regulators in accordance with the teachings of the present invention.

FIG. 4 is a diagram 401 illustrating the relationships of output current and output voltage of several embodiments of a power supply in accordance with the teachings of the present invention. As illustrated in characteristic curve 403 of FIG. 4, one embodiment of a power supply in accordance with the teachings of the present invention exhibits a substantially constant output current/constant output voltage characteristics. That is, as output current increases, output voltage remains substantially constant until the output current reaches an output current threshold. As the output current approaches the output current threshold, output voltage decreases as the output current remains substantially constant over the drop in output voltage. It is appreciated that the constant output voltage/constant output current characteristics of one embodiment of the present invention are suitable for battery charger applications or the like.

In another embodiment, characteristic curve 405 shows that one embodiment of a power supply in accordance with the teachings of the present invention has a substantially constant voltage until the output current reaches an output current threshold. After the output current threshold is reached, the output current increases as output voltage decreases. In yet another embodiment, characteristic curve 407 shows that another embodiment of a power supply in accordance with the teachings of the present invention has a substantially constant voltage until the output current reaches an output current threshold. After the output current threshold is reached, the output current decreases as output voltage decreases.

In one embodiment, control circuit 367 in FIG. 3 provides constant output voltage control by reducing the duty cycle of power switch 365 when current sensor 369 senses that the current received at current sense terminal 325 has reached the regulation threshold. In one embodiment, substantially accurate regulation is provided by power supply regulator 321 by control circuit 367 causing relatively large duty cycle changes in power switch 365 for relatively slight changes in current sensed by current sensor 369 above the regulation threshold. As a result, the current received through current sense terminal 325 remains substantially constant near the regulation threshold in one embodiment of the present invention.

In one embodiment, the constant output voltage value of characteristic curve 403 in FIG. 4 is determined by the value of resistor 239 and the turns ratio of the transformer of energy transfer element 245 in FIG. 2 for a given regulation threshold current value. In one embodiment, the constant output current value of characteristic curve 403 in FIG. 4, is determined by the current limit of power switch 365 at the regulation threshold, the turns ratio of the transformer of energy transfer element 245, and the inductance of primary winding 261. It is appreciated that it is possible to select any combination of output voltage and constant current value within the power range of power supply regulator 321 by selecting an appropriate primary inductance and turns ratio for the transformer of energy transfer element 245 and the value of resistor 239.

Thus, in one embodiment, constant output voltage/constant output current characteristics are provided by power supply 201 through regulation of the reflected voltage V1 257.

Figure 5:
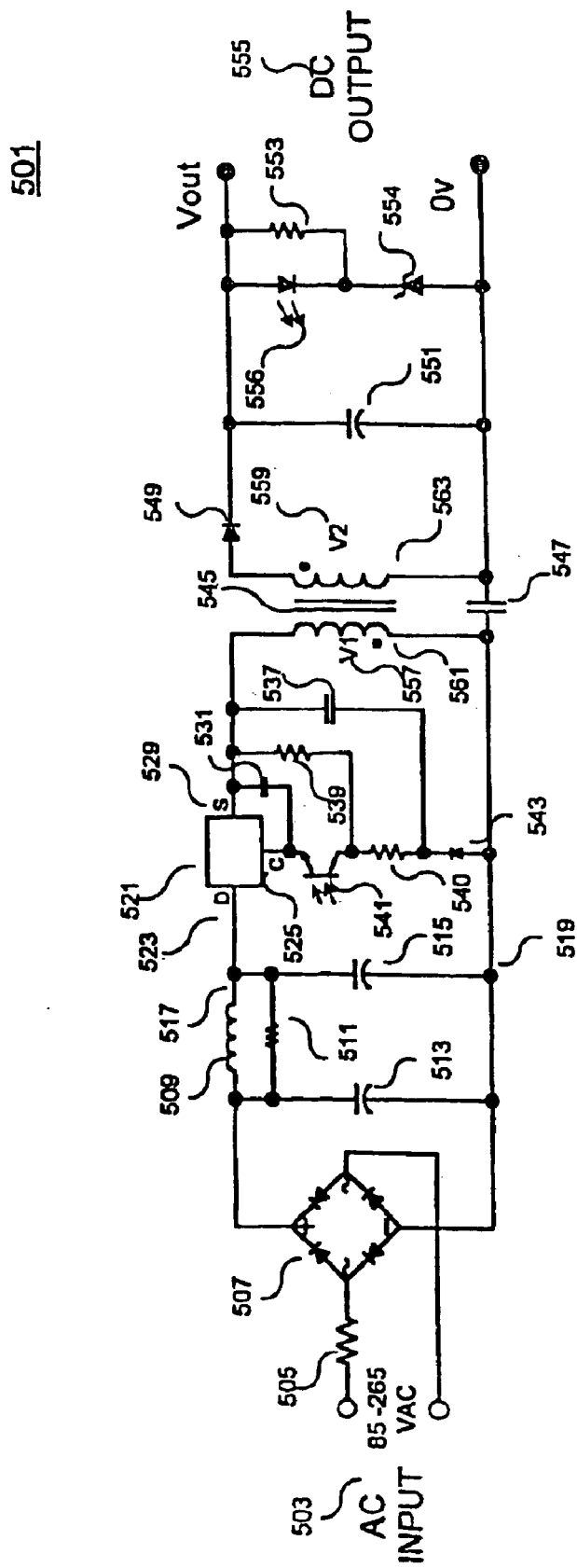
FIG. 5 is a schematic illustrating yet another embodiment of a power supply including a power supply regulator coupled to regulate a voltage at the output of the energy transfer element using a current derived from the voltage across the energy transfer element input in accordance with the teachings of the present invention.

FIG. 5 is a schematic of another embodiment of a power supply 501 in accordance with the teachings of the present invention. As shown, one embodiment of power supply 501 is a flyback converter having AC input 503 and a DC output 555. Rectifier 507 converts the AC from AC input 503 to DC, which is then filtered in one embodiment by capacitors 513 and 515, which are coupled in parallel across rectifier 507. In one embodiment, the fundamental operation and transfer of energy realized with power supply 501 of FIG. 5 is similar to that described above in connection with power supply 201 of FIG. 2.

In one embodiment, the reversal of voltages in V1 557 and V2 559 when a power switch included in power supply regulator 521 is off allows diode 549 to conduct to deliver stored energy in the energy transfer element 545 to DC output 555. In addition, the reversal of voltages in V1 557 and V2 559 allows diode 543 to conduct, which enables capacitor 537 to sample and hold the reflected voltage V1 557 across primary winding 561.

As shown in the embodiment depicted in FIG. 5, power supply 501 includes an opto-coupler including an output transistor 541 and an input light emitting diode (LED) 556. Output transistor is coupled to an electrical terminal 525 of power supply regulator 521 and is coupled to primary winding 561 through diode 543 and resistor 540. Input LED 556 is coupled to DC output 555 and coupled to secondary winding 563 through diode 549. In one embodiment, electrical terminal 525 of power supply regulator 521 is a low impedance current sense terminal that senses current through opto-coupler output transistor 541. The current that flows through resistor 540 and opto-coupler output transistor 541 is derived from the voltage V1 557 across the input of energy transfer element 545 or primary winding 561.

In one embodiment, the current that flows through the opto-coupler output transistor 541 is responsive to the voltage difference between the DC output voltage 555 and the sum of the opto coupler input LED 556 forward voltage drop and the zener voltage of a zener diode 554 coupled between input LED 556 and DC output 555 as shown in FIG. 5. It is appreciated that in another embodiment, the zener 554 could be replaced with another component providing a reference voltage to determine the output regulation voltage. In one embodiment, zener diode 554 is biased with current flowing through a resistor 553 coupled across input LED 556 as shown in FIG. 5 to improve the dynamic impedance of zener diode 554. In one embodiment, the combination of resistors 540 and 539 coupled across capacitor 537 form a voltage divider to insure that voltage V1 557 across the primary winding 561 at the input of energy transfer element 545 does not exceed the voltage rating of the output transistor 541.

Figure 6:
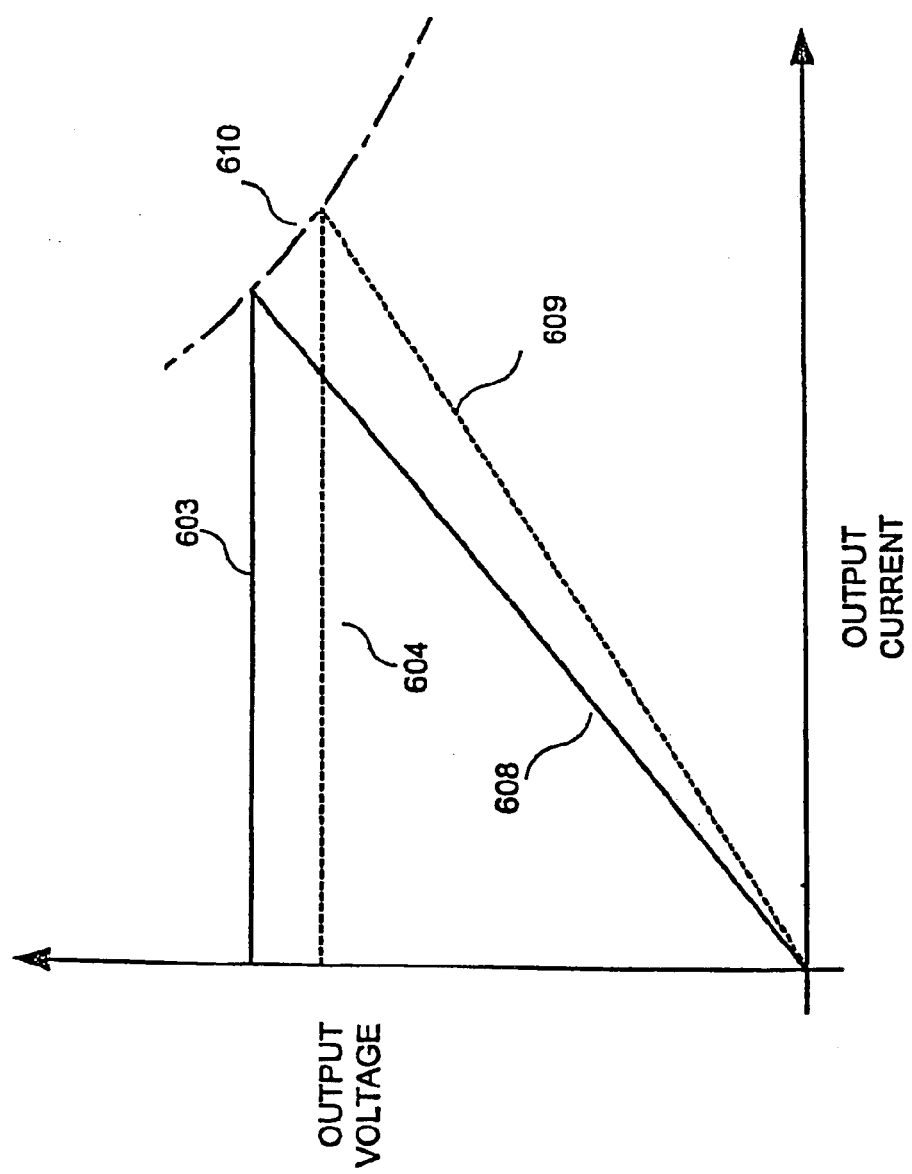
FIG. 6 is a diagram illustration the output current/voltage relationship for other embodiments of power supply regulators in accordance with the teachings of the present invention.

In one embodiment, the power supply 501 of FIG. 5 provides a substantially constant output voltage of a value dependent at least in part on the design choice of zener diode 554 at output power levels below the peak output power capability of the power supply 501. FIG. 6 illustrates two examples of substantially constant output voltage characteristics, 603 and 604 exhibited by various embodiments of power supplies in accordance with the teachings of the present invention. The peak output power capability of the power supply is shown as characteristic curve 610 in FIG. 6, the value of which may be dependent on a number of power supply variables including the specification of the power supply regulator 521, value of the AC input voltage 503, the capacitance values of capacitors 513 and 515 in addition to the design of energy transfer element 545. It is appreciated that the peak output power capability in general of a flyback power supplies and their dependence on the above variables is well documented in literature in the art.

As shown in FIG. 6, the intersection of the substantially constant output voltage characteristics, 603 or 604 with the power supply peak output power characteristic, 610, defines the point where a power supply according to the teachings of the present invention is no longer capable of supplying more output power. At this point, the power supply output voltage falls out of regulation and the feedback current through output transistor 541 falls substantially to zero. In one embodiment of the power supply regulator 521, at the point where the peak output power is reached, the output voltage is allowed to fall to substantially zero as shown by characteristics 608 and 609.

In one embodiment, the power supply regulator 521 will periodically restart to establish the output power requirement at the DC output 555 of the power supply 501. If the output power requirement continues to exceed the maximum output capability of the power supply 501, the DC output 555 voltage is again allowed to fall to substantially zero as shown by characteristics 608 and 609. In one embodiment, this process is repeated periodically.

In one embodiment, the power supply regulator 521 is designed to maintain continuous operation when DC output 555 voltage regulation is lost. In this embodiment, the output characteristic is defined by the peak output power characteristic curve of 610.

Figure 7:
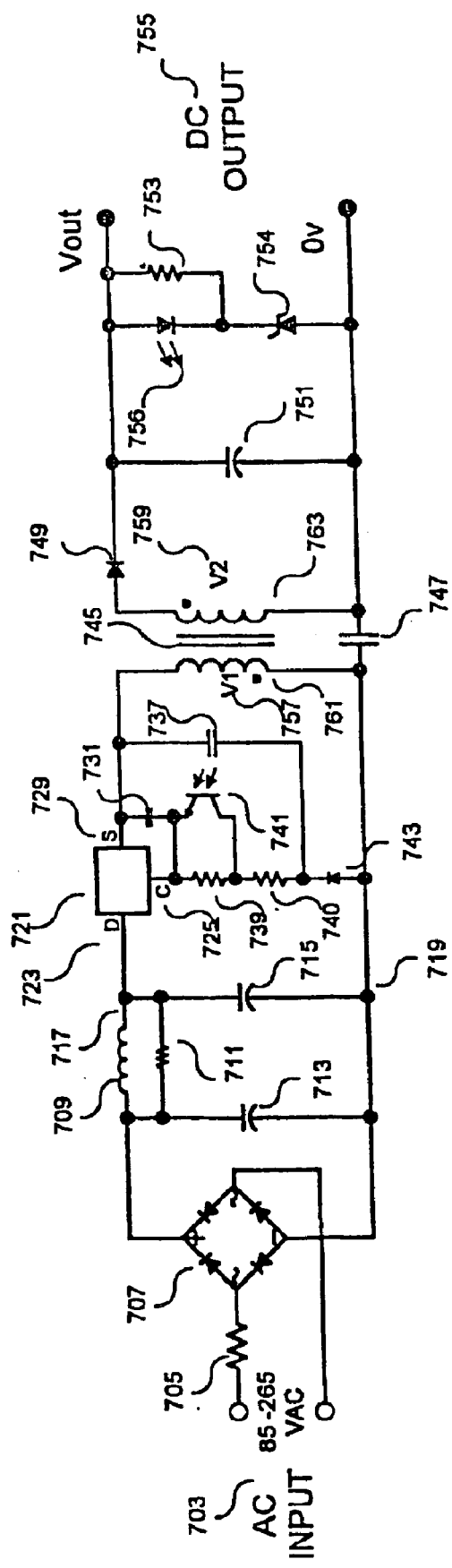
FIG. 7 is a schematic illustrating still another embodiment of a power supply including a power supply regulator coupled to regulate a voltage at the output of the energy transfer element using a current derived from the voltage across the energy transfer element input in accordance with the teachings of the present invention.

FIG. 7 is a schematic of another embodiment of a power supply 701 in accordance with the teachings of the present invention. As shown, one embodiment of power supply 701 is a flyback converter having AC input 703 and a DC output 755. Rectifier 707 converts the AC from AC input 703 to DC, which is then filtered in one embodiment by capacitors 713 and 715, which are coupled in parallel across rectifier 707. In one embodiment, the fundamental operation and transfer of energy realized with power supply 701 of FIG. 7 is similar to that described above in connection with power supply 201 of FIG. 2.

In one embodiment, the reversal of voltages in V1 757 and V2 759 when a power switch included in power supply regulator 721 is off allows diode 749 to conduct to deliver stored energy in the energy transfer element 745 to DC output 755. In addition, the reversal of voltages in V1 757 and V2 759 allows diode 743 to conduct, which enables capacitor 737 to sample and hold the reflected voltage V1 757 across primary winding 761.

As shown in the embodiment depicted in FIG. 7, power supply 701 includes an opto-coupler including an output transistor 741 and an input light emitting diode (LED) 756. Output transistor is coupled to an electrical terminal 725 of power supply regulator 721 across resistor 739 and is coupled to primary winding 761 through diode 743 and resistor 740. Input LED 756 is coupled to DC output 755 and coupled to secondary winding 763 through diode 749. In one embodiment, electrical terminal 725 of power supply regulator 721 is a low impedance current sense terminal that senses current through resistor 740, and the parallel combination of resistor 739 and opto-coupler output transistor 741. The current that flows into the current sense terminal 725 is derived from the voltage V1 757 across the primary winding 761 or the input of energy transfer element 745.

In one embodiment, the current that flows through the opto-coupler output transistor 741 is responsive to the voltage difference between the DC output voltage 755 the sum of the opto coupler input LED 756 forward voltage drop and the zener voltage of zener diode 754 coupled between input LED 756 and DC output 755 as shown in FIG. 7. In one embodiment, zener 754 is biased with current flowing through a resistor 753 coupled across input LED 756 to improve the dynamic impedance of the zener diode 754. It is appreciated that in another embodiment, the zener 754 could be replaced with another component providing a reference voltage to determine the output regulation voltage. In one embodiment, the combination of resistors 740 and 739 form a voltage divider to insure that voltage V1 757 across the primary winding 761 at the input of energy transfer element 745 does not exceed the voltage rating of the output transistor 741.

In one embodiment, when the output voltage 755 is below the sense voltage (out of voltage regulation), the opto-coupler output transistor 741 is off and the current that flows through resistor 739 and resistor 740 is responsive to the voltage across capacitor 737, which is responsive to reflected voltage V1 757 across the primary winding 761 at the input of energy transfer element 745.

Figure 8:
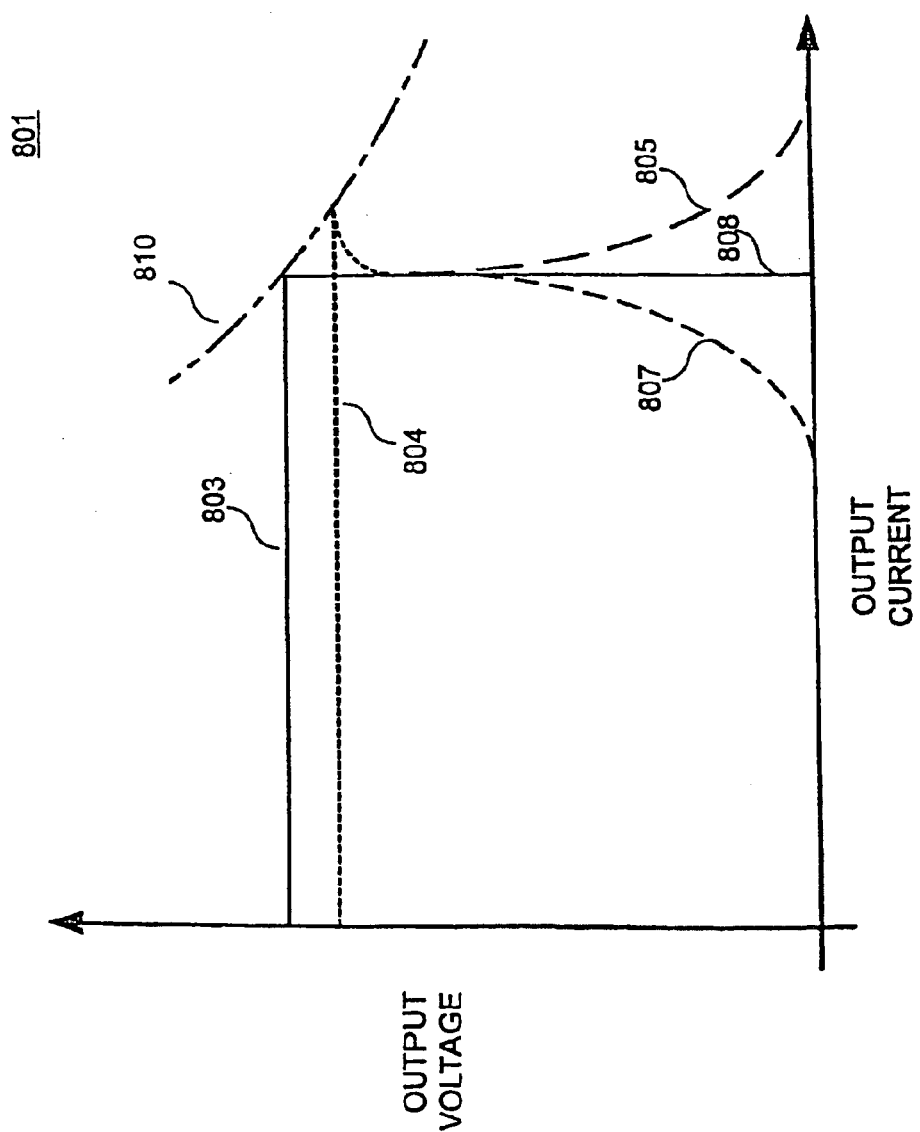
FIG. 8 is a diagram illustration the output current/voltage relationship for still other embodiments of power supply regulators in accordance with the teachings of the present invention.

The example embodiment illustrated in FIG. 7 therefore combines the control strategies of power supplies 201 and 501. FIG. 8 illustrates several possible resulting output characteristics exhibited by various embodiments of power supplies in accordance with the teachings of the present invention. For instance, at output power levels below the maximum power capability of the power supply 701, defined by characteristic curve 810, the power supply regulator 721 will regulate the delivered output voltage to be substantially constant based on the combined feedback current to terminal 725 through resistor 739 and opto coupler output transistor 741. When the maximum output power capability of the power supply 701 is reached, the current through opto-coupler input LED 756 will reduce to substantially zero and the opto-coupler output transistor 741 will substantially turn off reducing the current conducted in this path to substantially zero. The current feedback to terminal 725 of power supply regulator 721 is then provided substantially entirely through resistor 739. In one embodiment, characteristic curve 805 shows that one embodiment of a power supply 701 in accordance with the teachings of the present invention has an output current that increases as output voltage decreases.

In yet another embodiment, characteristic curve 807 shows that another embodiment of a power supply 701 in accordance with the teachings of the present invention has an output current that decreases as output voltage decreases.

In yet another embodiment, characteristic curve 808 shows that another embodiment of a power supply 701 in accordance with the teachings of the present invention has an output current that remains substantially constant over the drop in output voltage.

In one embodiment, the design choices of resistors 739 and 740 determine the value of the output current as the output voltage drops at output powers greater than the maximum power capability of the power supply 701. In one embodiment the design choice of input LED 756 determines the output voltage value at output powers less than the maximum power capability of the power supply 701. Characteristic curve 804 shows the output characteristic of one embodiment where the output current at the maximum output power is greater than the output current determined by the design choice of resistors 739 and 740. The output characteristic curve 804 shows that in this embodiment the output current will exceed that determined by the design choice of resistors 739 and 740 until the maximum output power is reached whereupon the output current will reduce to the value determined by the choice of resistor 739 and 740.

In the embodiments illustrated, flyback converter power supplies have been provided for explanations of the present invention. It is appreciated that other power supply configurations such as for example non-isolated buck converter power supplies using for example inductors for energy transfer elements may also be utilized in accordance with the teachings of the present invention. Since the inductor used in the non-isolated buck converter has only one winding which is coupled to both input and output, the equivalent turns ratio is equal to 1 and the reflected voltage is the same as the output voltage.

In the foregoing detailed description, the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method, comprising:
   switching a switch coupled between an input supply rail and an energy transfer element input of an energy transfer element, the energy transfer element having the energy transfer element input and an energy transfer element output;
   transferring energy from the energy transfer element input to the energy transfer element output in response to the switching of the switch; and
   reflecting a signal from the energy transfer element output to the energy transfer element input; and
   controlling the switching of the switch with control circuitry coupled to the energy transfer element input and to the switch in response to the reflected signal from the energy transfer element output.

2. The method of claim 1 further comprising:
   deriving a current from the reflected signal from the energy transfer element output at the energy transfer element input; and
   receiving the current with the control circuitry through an output transistor of an optocoupler, the optocoupler including an input light emitting diode (LED) coupled to the energy transfer element output and an output of the power supply and the output transistor coupled to the control circuitry.

3. The method of claim 1 wherein transferring energy from the energy transfer element input to the energy transfer element output comprises transferring energy from a primary winding of a transformer coupled to the energy transfer element input to a secondary winding of the transformer coupled to the energy transfer element output.

4. The method of claim 3 wherein the reflected signal from the energy transfer element output at the energy transfer element input comprises a voltage across the primary winding.

5. The method of claim 1 wherein switching the switch comprises switching a metal oxide semiconductor field effect transistor (MOSFET).

6. The method of claim 5 wherein switching the MOSFET comprises switching an n-channel MOSFET having a source terminal coupled to the energy transfer element input, a drain terminal coupled to the input supply rail and a gate terminal coupled to the control circuitry.

7. The method of claim 3 further comprising:
   coupling a first capacitor coupled in parallel with the primary winding during an off cycle of the switch; and
   decoupling the first capacitor from the primary winding during an on cycle of the switch, wherein the control circuitry is coupled to the first capacitor, wherein the reflected signal from the energy transfer element output at the energy transfer element input is responsive to a voltage across the energy transfer element output.

8. The method of claim 1 wherein controlling the switching of the switch with control circuitry comprises pulse width modulating the switch with a pulse width modulator included in the control circuitry coupled to the switch in response to the reflected signal from the energy transfer element output at the energy transfer element input.

9. The method of claim 1 wherein controlling the switching of the switch with control circuitry comprises adjusting cycles of a control signal coupled to be received by the switch with on/off control circuitry included in the control circuitry coupled to the switch in response to the reflected signal from the energy transfer element output at the energy transfer element input.

10. The method of claim 1 wherein controlling the switching of the switch with control circuitry comprises disabling switching of the switch in response to the reflected signal from the energy transfer element output at the energy transfer element input exceeding a threshold amount.

11. The method of claim 1 wherein the control circuitry and the switch are included on a single monolithic chip having as few as three electrical terminals.

* * * * *